United States Patent
Clagg et al.

(10) Patent No.: US 9,191,235 B2
(45) Date of Patent: Nov. 17, 2015

(54) MODERATING ELECTRONIC COMMUNICATIONS

(75) Inventors: Steve Clagg, Seattle, WA (US); Philip Y. Chan, Redmond, WA (US); Durlabh Malik, Bothell, WA (US); Shawn Thomas, Bothell, WA (US); Yamin Wang, Bellevue, WA (US); Elroy John Dyksen, Redmond, WA (US); Sara Manning, Bellevue, WA (US); Jiaming Wang, Bothell, WA (US); Daniel Godbout, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 1124 days.

(21) Appl. No.: 12/701,314

(22) Filed: Feb. 5, 2010

(65) Prior Publication Data
US 2011/0196931 A1 Aug. 11, 2011

(51) Int. Cl.
*H04L 12/28* (2006.01)
*H04L 12/58* (2006.01)
*G06Q 10/10* (2012.01)
*G06F 17/30* (2006.01)

(52) U.S. Cl.
CPC .............. *H04L 12/585* (2013.01); *H04L 51/12* (2013.01); *G06F 17/30507* (2013.01); *G06Q 10/107* (2013.01); *H04L 12/2874* (2013.01); *H04L 51/22* (2013.01)

(58) Field of Classification Search
None
See application file for complete search history.

(56) References Cited

U.S. PATENT DOCUMENTS

| | | | | |
|---|---|---|---|---|
| 5,682,460 | A * | 10/1997 | Hyziak et al. | 709/217 |
| 6,209,100 | B1 | 3/2001 | Robertson et al. | |
| 6,393,464 | B1 * | 5/2002 | Dieterman | 709/206 |
| 6,490,614 | B1 * | 12/2002 | Shaffer et al. | 709/206 |
| 7,197,539 | B1 * | 3/2007 | Cooley | 709/206 |
| 7,359,936 | B2 * | 4/2008 | Gruen et al. | 709/203 |
| 7,725,546 | B2 * | 5/2010 | Landesmann | 709/206 |
| 8,108,478 | B2 * | 1/2012 | Hayashi et al. | 709/206 |
| 8,325,925 | B2 * | 12/2012 | Drudis et al. | 380/279 |
| 2003/0023736 | A1 * | 1/2003 | Abkemeier | 709/229 |
| 2003/0110400 | A1 * | 6/2003 | Cartmell et al. | 713/202 |

(Continued)

OTHER PUBLICATIONS

Moderation in Exchange Server 2010, http://msexchangeteam.com/archive/2009/06/10/451584.aspx; Jun. 10, 2009, pp. 1-6.

(Continued)

*Primary Examiner* — Ario Etienne
*Assistant Examiner* — Ho Shiu
(74) *Attorney, Agent, or Firm* — Louise Bowman; Danielle Johnston-Holmes; Micky Minhas

(57) ABSTRACT

A method for moderating an electronic message includes intercepting the electronic message at a server computing device, and evaluating content of the electronic message at the server computing device to determine if the electronic message is required to enter a moderation workflow prior to delivering the electronic message to at least one recipient. The method also includes sending an approval request message from the server computing device to at least one moderator device, receiving a first moderation decision message at the server computing device from the at least one moderator, sending an update message from the server computing device to the at least one moderator to update the approval request message to include one or more properties of the first moderation decision, and removing the approval request message from the moderation workflow.

21 Claims, 9 Drawing Sheets

(56) References Cited

U.S. PATENT DOCUMENTS

| | | | |
|---|---|---|---|
| 2003/0145057 A1* | 7/2003 | Throop | 709/206 |
| 2003/0163537 A1* | 8/2003 | Rohall et al. | 709/206 |
| 2003/0177190 A1* | 9/2003 | Moody et al. | 709/206 |
| 2003/0191969 A1* | 10/2003 | Katsikas | 713/201 |
| 2003/0200267 A1* | 10/2003 | Garrigues | 709/206 |
| 2003/0204427 A1* | 10/2003 | Gune et al. | 705/8 |
| 2003/0220855 A1* | 11/2003 | Lam et al. | 705/34 |
| 2003/0229717 A1* | 12/2003 | Teague | 709/246 |
| 2004/0015554 A1* | 1/2004 | Wilson | 709/206 |
| 2004/0024810 A1* | 2/2004 | Choubey et al. | 709/203 |
| 2005/0060643 A1* | 3/2005 | Glass et al. | 715/501.1 |
| 2005/0160144 A1* | 7/2005 | Bhatia | 709/206 |
| 2005/0188044 A1* | 8/2005 | Fleming, III | 709/206 |
| 2005/0204159 A1* | 9/2005 | Davis et al. | 713/201 |
| 2005/0262208 A1* | 11/2005 | Haviv et al. | 709/206 |
| 2006/0004670 A1* | 1/2006 | McKenney et al. | 705/64 |
| 2006/0031333 A1* | 2/2006 | O'Neill | 709/206 |
| 2006/0053279 A1* | 3/2006 | Coueignoux | 713/154 |
| 2006/0095524 A1* | 5/2006 | Kay et al. | 709/206 |
| 2006/0153496 A1* | 7/2006 | Tanobe et al. | 385/24 |
| 2006/0173698 A1* | 8/2006 | Morley | 705/1 |
| 2007/0071199 A1* | 3/2007 | Ozeki | 379/142.05 |
| 2008/0098218 A1* | 4/2008 | Sibigtroth et al. | 713/168 |
| 2008/0098485 A1* | 4/2008 | Chiou | 726/27 |
| 2008/0189622 A1* | 8/2008 | Sanchez et al. | 715/752 |
| 2008/0208717 A1* | 8/2008 | Suleymanov | 705/27 |
| 2008/0288603 A1* | 11/2008 | Malcolm | 709/206 |
| 2009/0049134 A1* | 2/2009 | Kumhyr et al. | 709/206 |
| 2009/0210259 A1* | 8/2009 | Cardot et al. | 705/4 |
| 2009/0248806 A1 | 10/2009 | Teman | |
| 2010/0100944 A1* | 4/2010 | Fleming, III | 726/4 |
| 2010/0293385 A1* | 11/2010 | Nanda et al. | 713/176 |
| 2011/0264585 A1* | 10/2011 | Abdulhayoglu | 705/50 |
| 2012/0114113 A1* | 5/2012 | Zhao | 379/265.09 |

OTHER PUBLICATIONS

MailEnable Professional Edition Configuration Guide Version 3.0, http://www.mailenable.com/documentation/MailEnable_Professional_Guide_3_x.pdf; Sep. 13, 2007, pp. 1-120.

Groups Updates: CAPTCHA, Posting from the Owner Address, Email Moderation, http://www.ygroupsblog.com; Nov. 19, 2009, pp. 1-9.

Chapter 72. Moderate Pending Messages, http://www.niso.org/khelp/kmlm/user_help/html/moderate_pending_messages.html; 2008, pp. 1-4.

Chapter 36. Email Seems Slow, What Is Going on?, http://support.kavi.com/khelp/kmlm/user_help/html/email_slow.html; 2008, pp. 1-6.

Chapter 8. Mailing List Moderation, http://www.niso.org/khelp/kmlm/user_help/html/mailing_list_moderation.html; 2008, pp. 1-8.

Moderating Emails in Exchange 2010, http://www.exchangeinbox.com/article.aspx?i=144; Oct. 15, 2009, pp. 1-7.

Overview of List Configuration Options, https://calmail.berkeley.edu/docs/mailman/configuration.html; 2008, pp. 1-9.

* cited by examiner

MODERATING ELECTRONIC COMMUNICATIONS

BACKGROUND

In large organizations, it is sometimes necessary for certain communications to go through an approval process prior to being delivered to a final destination. For example, it may be desirable to evaluate the content of an e-mail message sent to a large distribution list to ensure compliance with appropriate usage policies. The evaluation process can require designated moderators to view the content of the respective communication and makes decisions about whether the communication should be allowed to the destination. Such a manual review process can be opaque and time-consuming.

SUMMARY

In one aspect, a computing device includes a processing unit, and a system memory connected to the processing unit. The system memory includes instructions that, when executed by the processing unit, cause the processing unit to: create an arbitration module configured to control a moderation workflow relating to an electronic message sent to at least one recipient, wherein the arbitration module delivers an approval request message to at least one moderator requesting a moderation decision designating delivery of the electronic message to the at least one recipient as approved or declined, and upon receipt of the moderation decision, the arbitration module updates the approval request message sent to the at least one moderator and removes the approval request message from the moderation workflow of the at least one moderator; and create an intercept module configured to intercept the electronic message when the electronic message is sent to the at least one recipient, wherein the intercept module evaluates content of the electronic message to determine whether the electronic message requires moderation and transfers the electronic message to the arbitration module upon determining the electronic message requires moderation.

In another aspect, a method for moderating an electronic message includes: intercepting the electronic message at a server computing device; evaluating content of the electronic message at the server computing device to determine if the electronic message is required to enter a moderation workflow prior to delivering the electronic message to at least one recipient; storing the electronic message at the server computing device upon determining the electronic message is required to enter the moderation workflow; sending an approval request message from the server computing device to at least one moderator device, the approval request message requesting a moderation decision designating delivery of the electronic message to the at least one recipient as approved or declined; receiving a first moderation decision message at the server computing device from the at least one moderator; sending an update message from the server computing device to the at least one moderator to update the approval request message to include one or more properties of the first moderation decision; and removing the approval request message from the moderation workflow.

In yet another aspect, a computer readable storage medium having computer-executable instructions that, when executed by a computing device, cause the computing device to perform steps including: intercepting the electronic message at a computing device; evaluating content of the electronic message at the computing device to determine if the electronic message is required to enter a moderation workflow prior to delivering the electronic message to at least one recipient; storing the electronic message at the computing device upon determining the electronic message is required to enter the moderation workflow; sending an approval request message from the computing device to an inbox of at least one moderator, the approval request message requesting a moderation decision designating delivery of the electronic message to the at least one recipient as approved or declined; receiving a first moderation decision message at the computing device from the at least one moderator; if a first moderation decision message is received from the at least one moderator, sending an update message from the computing device to the at least one moderator to update the approval request message to include one or more properties of the first moderation decision; if a pre-defined time period has elapsed since the approval request message was sent to the at least one moderator, sending a notification to the sender indicating that the electronic message will not be approved; removing the approval request message from the moderation workflow by moving the approval request message from the inbox to a deleted items folder of the at least one moderator.

This Summary is provided to introduce a selection of concepts, in a simplified form, that are further described below in the Detailed Description. This Summary is not intended to identify key or essential features of the claimed subject matter, nor is it intended to be used in any way to limit the scope of the claimed subject matter.

DESCRIPTION OF THE DRAWINGS

Aspects of the present disclosure may be more completely understood in consideration of the following detailed description of various embodiments in connection with the accompanying drawings.

DETAILED DESCRIPTION

The present application is directed to systems and methods for moderating electronic communications in a computing system environment.

Moderation techniques described herein include automated decision making with respect to deciding which communications should be moderated. Communications that are identified for moderation are held pending approval for delivery. Designated moderators receive a separate communication including a request for approval regarding a respective pending communication. A decision is delivered as a response to the separate communication. The original communication is processed based on the decision, and the separate communication including the request for approval is removed from the workflow of the designated moderators.

The following example embodiments are described herein with respect to Microsoft Exchange Server from Microsoft Corporation of Redmond, Wash. However, the systems and methods of the present disclosure are applicable to any situation in which it is desirable to moderate electronic communications in a computing system environment.

Figure 1:
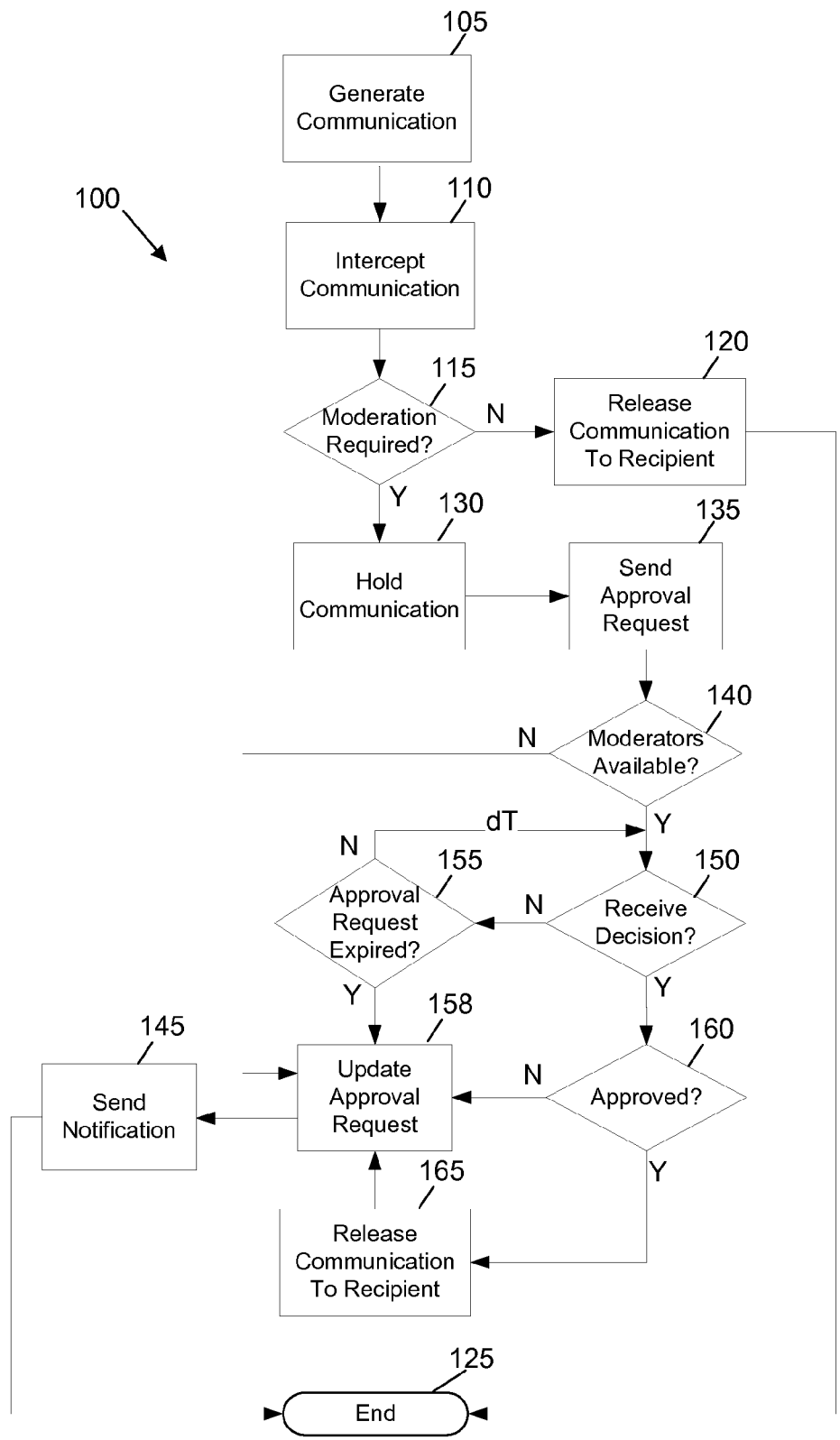
FIG. 1 is a flowchart of example systems and methods for moderating electronic communications in a computing system environment.

Referring now to FIG. 1, an example method 100 for moderating electronic communications in a computing system environment is shown. In some embodiments, the example method 100 is implemented on a server device configured as a business server that implements messaging and collaborative business processes, such as described below in connection with FIG. 2. However, other embodiments are possible as well.

The example method 100 begins at a module 105, when a sender composes and sends an electronic communication to a recipient, such as an individual or a group of individuals. In some embodiments, the electronic communication is composed on a client computing device, such as described below in connection with FIG. 2.

Operational flow proceeds to an intercept module 110 configured to intercept the electronic communication prior to delivery to the recipient. Operational flow then proceeds to a first decision module 115. The first decision module 115 is configured to evaluate content of the electronic communication to determine if the communication is required to go through an approval step prior to delivering the communication to the recipient, referred to herein as moderation. For example, in some embodiments, content of the electronic communication is evaluated against one or more pre-defined transport rules, such as described below in connection with FIG. 6. However, other embodiments are possible as well. For example, in some embodiments, the first decision module 115 is additionally configured to interpret content of the electronic communication to implement an action such as, for example, submit an automated request to join a distribution group in response to a request contained with the electronic communication. Still other embodiments are possible as well.

If the first decision module 115 determines that the electronic communication does not require moderation, operational flow proceeds to a first delivery module 120. The first delivery module 120 is configured to release the electronic communication to the recipient. However, other embodiments are possible as well. For example, in some embodiments, the first delivery module 120 is additionally configured to implement an action such as, for example, execute an automated request to join a distribution group in response to a request contained with the electronic communication. Still other embodiments are possible as well. Following release of the electronic communication by the first delivery module 120, operational flow proceeds to an end module 125 corresponding to termination of the method 100.

If the first decision module 115 determines that the electronic communication does require moderation, operational flow proceeds to a hold module 130. The hold module 130 is configured to store the electronic communication pending a decision from a moderator designating the communication as approved or declined for delivery to the recipient.

Operational flow then proceeds to an approval request module 135. The approval request module 135 is configured to send an approval request message to one or more moderators requesting a decision designating the electronic communication as approved or declined for delivery to the recipient.

Operational flow then proceeds to a second decision module 140. The second decision module 140 is configured to determine if each of the one or more moderators are unavailable to approve or decline delivery of the electronic communication to the recipient. For example, in some embodiments, the approval request message as sent by the approval request module 135 may result in a non-deliverable response (NDR) or an out-of-office response (OOF) designating a respective moderator as unavailable, such as described below in connection with FIG. 7. Other embodiments are possible as well.

If the second decision module 140 determines that each of the one or more designated moderators are unavailable, operational flow proceeds to an update module 158. In the example embodiment, the update module 158 is configured to update the approval request message as sent to the one or more moderators by the approval request module 135 to reflect that each of the one or more designated moderators are unavailable. Additionally, the update module 158 is configured to remove the approval request message from the workflow of each of the one or more moderators, as described below in connection with FIG. 7.

Operational flow then proceeds to a notification module 145. In the example embodiment, the notification module 145 is configured to deliver a notification to the sender indicating that the electronic communication will not be approved for delivery and will have to be resubmitted at a later time. Following delivery of the notification by the notification module 145, operational flow proceeds to the end module 125.

If the second decision module 140 determines that at least one of the moderators are available, operational flow proceeds to a third decision module 150. The third decision module 150 is configured to determine if a decision was received from one of the moderators indicating the electronic communication as approved or declined for delivery to the recipient, based on the approval request message as sent by the approval request module 135.

If the third decision module 150 determines that a decision has not been received from one of the moderators, operational flow proceeds to a fourth decision module 155. If the third decision module 150 determines that a decision has been received from one of the moderators, operational flow proceeds to a fifth decision module 160, as described further below.

The fourth decision module 155 is configured to determine if a pre-defined time period has elapsed since the approval request message was sent by the approval request module 135, thereby designating that the approval request has expired.

If the fourth decision module 155 determines that the approval request has expired, operational flow proceeds to the update module 158. In the example embodiment, the update module 158 is configured to update the approval request message as sent to the one or more moderators by the approval request module 135 to reflect that the approval request message has expired. In this manner, the one or more moderators are notified that a status of the approval request message has changed. Additionally, the update module 158 is configured to remove the approval request message from the workflow of each of the one or more moderators.

Operational flow then proceeds to the notification module 145. In the example embodiment, the notification module 145 is configured to deliver a notification to the sender indicating that the approval request message for the electronic communication has expired and the electronic communication will not be delivered to the recipient. Following delivery of the notification by the notification module 145, operational flow proceeds to the end module 125.

If the fourth decision module 155 determines that the approval request has not expired, operational flow proceeds back to the third decision module 150 after a pre-determined time interval, dT. Operational flow proceeds between the third decision module 150 and the fourth decision module 155 until it is either determined that a decision has been received from one of the moderators or it is determined that the approval request message has expired.

As mentioned above, if the third decision module 150 determines that a decision has been received from one of the moderators, operational flow proceeds to the fifth decision module 160. The fifth decision module 160 is configured to determine if the electronic communication has been approved or declined for delivery to the recipient.

If the fifth decision module 160 determines that the electronic communication has been declined for delivery, operational flow proceeds to the update module 158. In the example embodiment, the update module 158 is configured to update the approval request message as sent to the one or more moderators to reflect that the electronic communication has been declined for delivery. Additionally, the update module 158 is configured to remove the approval request message from the workflow of each of the one or more moderators.

Operational flow then proceeds to the notification module 145. In the example embodiment, the notification module 145 is configured to deliver a notification to the sender indicating that the electronic communication has been declined for delivery to the recipient. Following delivery of the notification by the notification module 145, operational flow proceeds to the end module 125.

If the fifth decision module 160 determines that the electronic communication has been approved for delivery, operational flow proceeds to a second delivery module 165. The second delivery module 165 is configured to release the electronic communication to the recipient as stored in the hold module 130. Operational flow then proceeds to the update module 158. In the example embodiment, the update module 158 is configured to update the approval request message as sent to the one or more moderators to reflect that the electronic communication has been approved for delivery to the recipient. Additionally, the update module 158 is configured to remove the approval request message from the workflow of each of the one or more moderators.

Operational flow then proceeds to the notification module 145. In the example embodiment, the notification module 145 is configured to deliver a notification to the sender indicating that the electronic communication has been approved for delivery. Following delivery of the notification by the notification module 145, operational flow proceeds to the end module 125.

Figure 2:
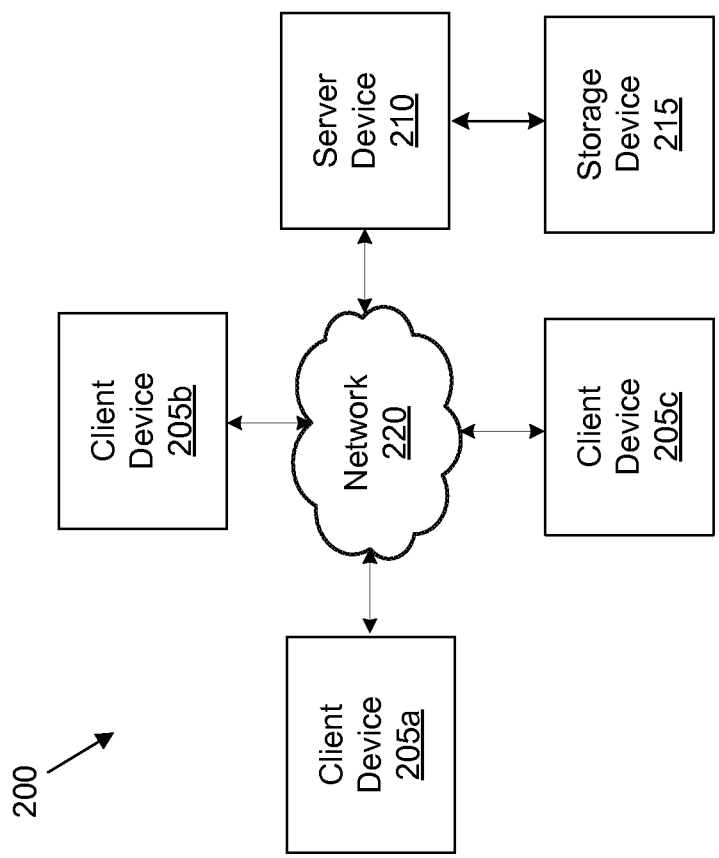
FIG. 2 shows an example networked computing environment.

Referring now to FIG. 2, an example networked computing environment 200 is shown in which aspects of the present disclosure may be implemented. The example environment 200 includes a plurality of client devices 205a-c (collectively, client devices 205), a server device 210, a storage device 215, and a network 220. However, other embodiments of the example environment 200 are possible as well. For example, the environment 200 may generally include more or fewer devices, networks, and other components as desired.

The client devices 205 and the server device 210 are general purpose computing devices, as described below in connection with FIG. 3. In example embodiments, the server device 210 is a business server that implements business processes. Example business processes include messaging and collaborative processes, data management processes, and others. Microsoft Exchange Server from Microsoft Corporation is an example of a business server that implements messaging and collaborative business processes in support of electronic mail, calendaring, and contacts and tasks features, in support of mobile and web-based access to information and in support of data storage. In some embodiments, the server device 210 includes of a plurality of interconnected server devices operating together to implement business processes.

The storage device 215 is a data storage device such as a relational database or any other type of persistent data storage device. The storage device 215 stores data in a predefined format such that the server device 210 can query, modify, and manage data stored thereon. Examples of such a data storage device include recipient mailbox stores, and address services such as ACTIVE DIRECTORY® directory service from Microsoft Corporation. In some embodiments, the storage device 215 includes a plurality of data storage devices logically grouped together into an interconnected "Farm" configuration. Other embodiments of the storage device 215 are possible.

The network 220 is a bi-directional data communication path for data transfer between one or more devices. In the example shown, the network 220 establishes a communication path for data transfer between the client devices 205 and the server device 210. In general, the network 220 can be of any of a number of wireless or hardwired WAN, LAN, Internet, or other packet-based communication networks such that data can be transferred among the elements of the example environment 200. Other embodiments of the network 220 are possible as well.

Figure 3:
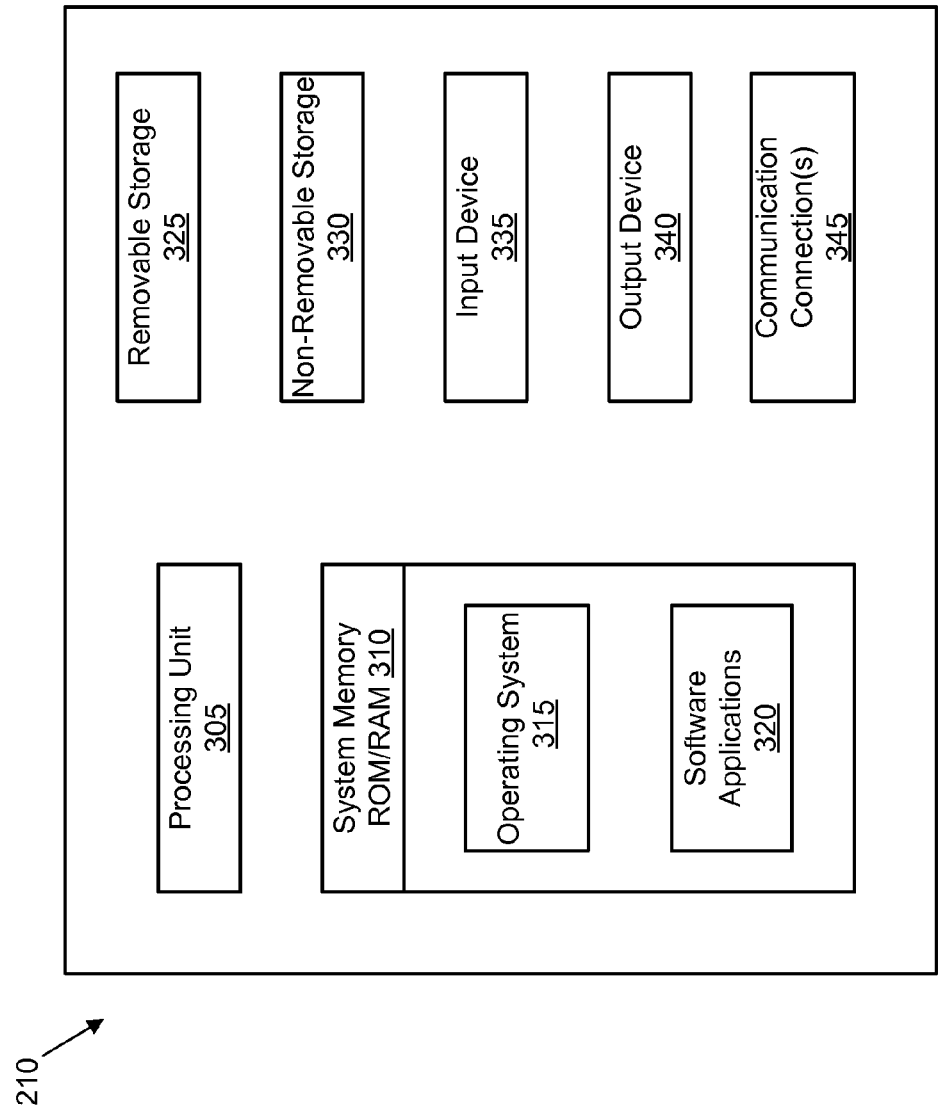
FIG. 3 shows an example computing device of the environment of FIG. 2.

Referring now to FIG. 3, the server device 210 of FIG. 2 is shown in further detail. As mentioned above, the server device 210 is a general purpose computing device. Example general purpose computing devices include a desktop computer, laptop computer, personal data assistant, smartphone, and others. The server device 210 includes at least one processing unit 305 and system memory 310.

The system memory 310 can store an operating system 315 for controlling the operation of a computing device. One example operating system 315 is WINDOWS® operating system from Microsoft Corporation, or a server, such as Microsoft Exchange Server, also from Microsoft Corporation.

The system memory 310 may also include one or more software applications 320 and may include program data. Software applications 320 may include many different types of single and multiple-functionality programs, such as an electronic mail program, a calendaring program, an Internet browsing program, a spreadsheet program, a program to track and report information, a word processing program, and many others. One example program is the OFFICE suite of applications from Microsoft Corporation.

The system memory 310 can include physical computer readable storage media such as, for example, magnetic disks, optical disks, or tape. Such additional storage is illustrated in FIG. 3 by removable storage 325 and non-removable storage 330. Computer readable storage media can include physical volatile and nonvolatile, removable and non-removable media implemented in any method or technology for storage of information, such as computer readable instructions, data structures, program modules, or other data. Computer readable storage media can also include, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by server device 210. Any such computer storage media may be part of or external to the server device 210.

The computer readable media also includes communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, communication media includes wired media such as a wired network or direct-wired connection, and wireless media such as acoustic, RF, infrared and other wireless media.

The server device 210 can also have any number and type of input devices 335 and output device 340. Example input devices 335 include a keyboard, mouse, pen, voice input device, touch input device, and others. Example output devices 340 include a display, speakers, printer, and others.

The server device 210 can also contain a communication connection 345 configured to enable communications with other computing devices over a network (e.g., network 220 of FIG. 2) in a distributed computing environment.

In example embodiments, the client device 205 of FIG. 2 is configured similar to the server device 210 described above.

Figure 4:
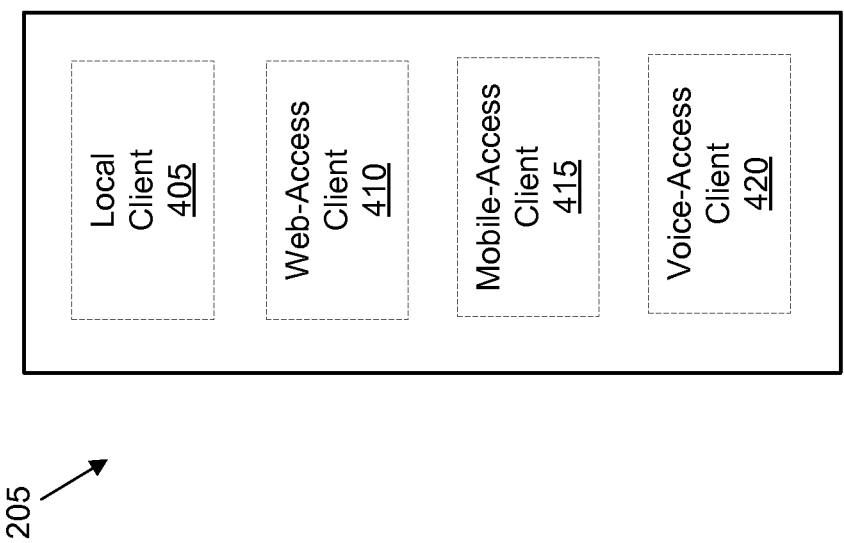
FIG. 4 shows example logical modules of client devices of the environment of FIG. 2.

Referring now additionally to FIG. 4, the client device 205 of FIG. 2 is also configured to include one or more different types of client interfaces to the server device 210. In the example shown, the client device 205 includes a local client 405, a web-access client 410, a mobile-access client 415, and a voice-access client 420. Other types of client interfaces to the server device 210 are possible as well.

The local client 405 is configured as a dedicated messaging and collaboration client that serves as an interface to the server device 210 and is part of a suite of applications executing on the client device 205. In one embodiment, the local client 405 includes the Microsoft OUTLOOK® messaging and collaboration client, which is an e-mail application that is part of the Microsoft Office suite. A user can compose, interact with, send and receive e-mails with the Microsoft OUTLOOK® messaging and collaboration client. Other embodiments of the local client 405 are possible.

The web-access client 410 is configured to accesses the server device 210 remotely using a network connection, such as the Internet. In one embodiment, the web-access client 410 is the Outlook Web Access webmail service of Microsoft Exchange Server. In the example embodiment, the client device 205 uses a web browser to connect to Microsoft Exchange Server via Outlook Web Access. This brings up a user interface similar to the interface in Microsoft OUTLOOK® messaging and collaboration client in which a user can compose, interact with, send and receive e-mails. Other embodiments of the web-access client 410 are possible.

The mobile-access client 415 is another type of client interface to the server device 210. In one embodiment, the mobile access client 415 includes the Microsoft Mobile Access with ACTIVESYNC® technology or the Microsoft Windows Mobile Device Center for Microsoft Vista or Windows 7. A user can synchronize messages between a mobile device and Microsoft Exchange Server using a mobile access client like Microsoft Mobile Access with ACTIVESYNC® technology. Example mobile devices include a cellular telephone, smartphone, a personal digital assistant, and others. Other embodiments of the mobile-access client 415 are possible.

The voice-access client 420 is yet another type of client interface to the server device 210. In some embodiments, the voice-access client 420 includes Microsoft Exchange Unified Messaging that is supported in Microsoft Exchange Server. With Microsoft Exchange Unified Messaging, users have one inbox for e-mail and voicemail. Voicemails are delivered directly into the Microsoft OUTLOOK® messaging and collaboration client inbox. In addition, Microsoft Exchange Unified Messaging delivers access from the Microsoft OUTLOOK® messaging and collaboration client, Outlook Web Access, a variety of mobile devices and ordinary telephones. Other embodiments of the voice-access client 420 are possible.

Figure 5:
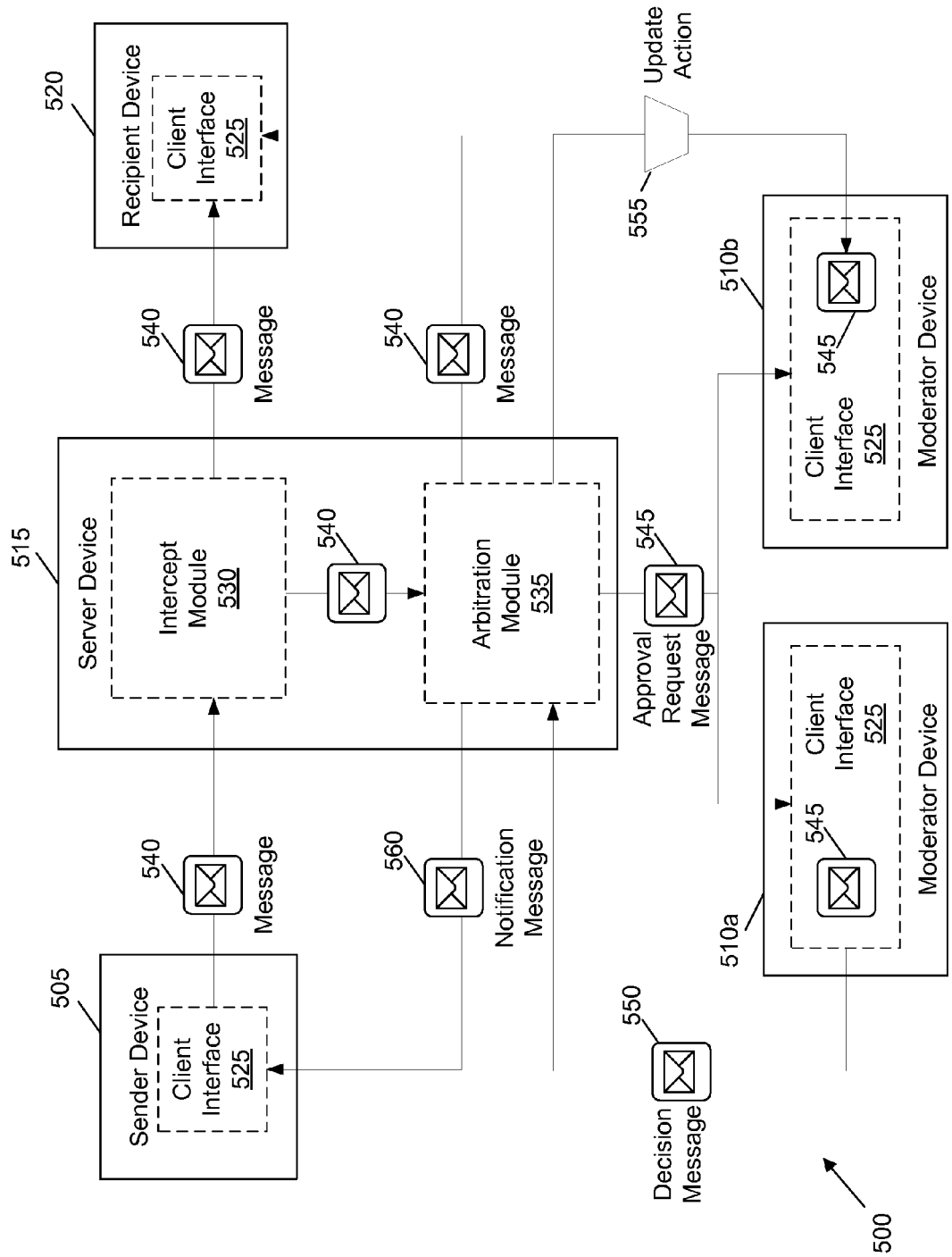
FIG. 5 shows example communications between example client devices and an example server device.

Referring now to FIG. 5, a schematic block diagram 500 illustrates example communications between example client devices and an example server device in accordance with the present disclosure. The example diagram 500 includes a sender device 505, a plurality of moderator devices 510a-b (collectively, moderator devices 510), a server device 515, and a recipient device 520. However, other configurations are possible as well. For example, the schematic block diagram 500 may generally include more or fewer sender devices, moderator devices, server devices, and recipient devices, and other components as desired.

In example embodiments, the sender device 505, moderator devices 510, server device 515, and recipient device 520 are configured similar to the respective client devices 205 and server device 210 as described above in connection with FIGS. 2 and 3. The sender device 505, moderator devices 510, and recipient device 520 each further include a client interface 525 similar to the client interfaces as described above in connection with FIG. 4. The server device 515 includes an intercept module 530 and an arbitration module 535, as described in further detail below.

In example embodiments, an electronic communication such as an e-mail message 540 is composed on the sender device 505 via the corresponding client interface 525. Composition of the e-mail message 540 includes adding recipients and content. One or more recipients may be individually designated and/or collectively designated as one or more distribution groups. In the example shown, the recipient corresponds to the recipient device 520. Example content of the e-mail message 540 may include text, graphics, attachments, a unique message identification, and other information such as sender SMTP address, recipient SMTP address, and message sent-time. Still other content of the e-mail message 540 is possible as well.

The e-mail message 540 is sent to the recipient device 520 following composition thereof. In general, the intercept module 530 of the server device 515 is configured to intercept and analyze the content of the e-mail message 540 as sent to the recipient device 520 to determine if the e-mail message 540 requires moderation. When the intercept module 530 determines that the e-mail message 540 does not require moderation, the intercept module 530 directly releases the e-mail message 540 to the recipient device 520. In some embodiments, the e-mail message 540 is delivered to an inbox of the client interface 525 of the recipient device 520. However, when the intercept module 530 determines that the e-mail message 540 does require moderation, the intercept module 530 routes the e-mail message 540 to the arbitration module 535.

The example arbitration module 535 is configured to control workflow related to processing of the e-mail message 540 pending a moderation decision or lack thereof. In example embodiments, upon receipt of the e-mail message 540 as routed from the intercept module 530, the arbitration module 535 generates and sends an approval request message 545 to the moderator devices 510. The approval request message 545 permits a moderator to designate the e-mail message 540 as approved or denied for delivery to the recipient device 520. In some embodiments, the approval request message 545 is an e-mail message that is delivered to an inbox of the client interface 525 of the respective moderator device 510*a-b*. In the example embodiment, the approval request message 545 may be opened and a moderation decision designating the e-mail message 540 as approved or denied for delivery to the recipient device 520 may be set forth by a respective moderator device 510*a-b* via the corresponding client interface 525.

When a moderation decision is made regarding the pending e-mail message 540 by at least one of the respective moderator device 510*a-b*, a decision message 550 is sent to the arbitration module 535 containing details regarding the decision. In some embodiments, the decision message 550 is an e-mail message that is delivered to the arbitration module 535. In the example shown, a user of the moderator device 510*a* has made a decision designating the e-mail message 540 as approved or denied before a user of the moderator device 510*a*. In this manner, the decision message 550 is sent from the client interface 525 of the moderator device 510*a* to the arbitration module 535. However, other embodiments are possible as well. For example, the user of the moderator device 510*b* may be the first to make a decision designating the e-mail message 540 as approved or denied. However, other decisions regarding the e-mail message are possible as well.

Upon receipt of the decision message 550, the arbitration module 535 is configured to implement an update action 555 that operates on the approval request message 545 stored in the inbox of the client interface 525 of the moderator device 510*b*. In example embodiments, the update action 555 locates the approval request message 545 in the mailbox of the client interface 525 of the moderator device 510*b* and adds one or more properties to the approval request message 545 based on a content of the decision message 550. However, other embodiments are possible as well. For example, in some embodiments, the update action 555 locates the approval request message 545 in other folders of a mailbox of the client interface 525. Still other embodiments are possible as well. Example properties include specification that a decision was received from moderator device 510*a*, the time the decision was received from moderator device 510*a*, and whether the e-mail message 540 message was approved or denied for delivery to the recipient device 520, and other properties. In some embodiments, the update action 555 additionally moves the approval request message 545 to a deleted items folder of the client interface 525 of the moderator device 510*b*. Other embodiments of the update action 555 are possible as well.

The arbitration module 535 is additionally configured to generate and send a notification message 560 to the sender device 505 and either release or delete the e-mail message 540 based on the content of decision message 550. In some embodiments, the notification message 560 is an e-mail message that is delivered to an inbox of the client interface 525 of the sender device 505. For example, if the decision message 550 contains an approval designating the e-mail message 540 as permissible for delivery to the recipient device 520, the notification message 560 is populated with information indicating that the e-mail message 540 has been approved for delivery to the recipient device 520. In the example scenario, the arbitration module 535 releases the e-mail message 540 to the recipient device 520. However, if the decision message 550 contains a denial designating the e-mail message 540 as impermissible for delivery to the recipient device 520, the notification message 560 is populated with information indicating that e-mail message 540 has been denied for delivery to the recipient device 520. The arbitration module 535 subsequently deletes the e-mail message 540.

Figure 6:
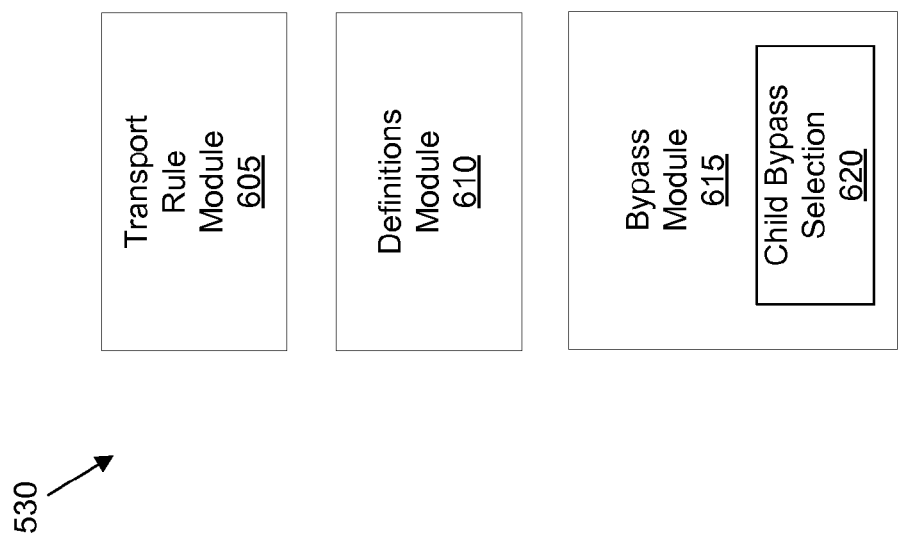
FIG. 6 shows example logical modules of an example intercept module of the server device of FIG. 5.

Referring now to FIG. 6, the example intercept module 530 of FIG. 5 is shown in further detail. In general, intercept module 530 includes user configurable logical modules of software executing on the server device 515 that enable the intercept module 530 to intercept and analyze content of an electronic communication (e.g., the e-mail message 540) as sent to one or more individual recipients (e.g., the recipient device 520) and/or one or more distribution groups. Subsequently, the intercept module 530 either releases the electronic communication to designated recipients or forwards the electronic communication to the arbitration module 535 for further processing.

The example intercept module 530 includes a transport rule module 605, a definitions module 610, and a bypass module 615.

The transport rule module 605 contains user configurable definitions specifying one or more rules that are evaluated by the intercept module 530 to determine if an the electronic communication should be moderated, based on content of the electronic communication. For example, in the example embodiment of FIG. 5, the transport rule module 605 may contain definitions specifying one or more rules related to the text, graphics, attachments, unique message identification, sender SMTP address, recipient SMTP address, and message sent-time of the e-mail message 540 to determine whether the e-mail message 540 should be moderated. If the intercept module 530 determines that one or more content of the e-mail message 540 matches a condition of one or more rules in the transport rule module 605, the e-mail message 540 is forwarded to the arbitration module 535 for entry into moderation workflow. In this manner, moderation is integrated with transport rules as an action that can be applied to the e-mail message 540 such that any transport rule can be used to decide whether the e-mail message 540 should be moderated. Other embodiments of the transport rule module 605 are possible.

The definitions module 610 contains user configurable definitions specifying recipients that should be moderated as well as definitions specifying moderators for a respective communication. In the example embodiment of FIG. 5, the intercept module 530 accesses the definitions module 610 to determine if the e-mail message 540 requires moderation based on information related to a recipient operating the recipient device 520. For example, if a recipient John Doe having an example SMTP address john.doe@microsoft.com is specified in the definitions module 610, and the e-mail message 540 is sent to john.doe@microsoft.com, the intercept module 530 prevents delivery of the e-mail message 540 and forwards the e-mail message 540 to the arbitration module 535 as described above. Other embodiments of the definitions module 610 are possible.

The bypass module 615 contains user configurable definitions specifying one or more users who can send messages freely without requiring approval by moderators. In the example embodiment of FIG. 5, the intercept module 530 accesses the bypass module 615 to determine if the e-mail message 540 should be released to the recipient device 520 based on information related to a sender operating the sender device 505. For example, if a sender Jane Doe having an example SMTP address jane.doe@microsoft.com is specified in the definitions module 610, and the e-mail message 540 is sent by jane.doe@microsoft.com, the intercept module 530 directly releases the e-mail message 540 to the recipient device 520 as described above.

In some embodiments, the example bypass module 615 further contains user configurable definitions specifying child bypass via a child bypass selection 625. For example, in some embodiments, a main distribution group may contain multiple child subgroups. The multiple child subgroups may also contain child subgroups. As a result, an electronic communication (e.g., the e-mail message 540) sent to the main distribution group may require multiple levels of moderation. For example, moderation of the main distribution group as well as any nested subgroups that are also moderated. The example child bypass selection 625 provides configuration to bypass child moderation such that multiple levels of moderation are avoided in scenarios when such moderation bypass is desired. In the example embodiment of FIG. 5, the intercept module 530 access bypass module 615 when evaluating whether the e-mail message 540 should be moderated based on group settings. In this manner, if the e-mail message 540 is sent to a main distribution group, having one or more nested subgroups, with child bypass selection 625 set to true, only moderators of the main distribution group receive an approval request message 545, thereby avoided of multiple levels of moderation. Other embodiments of the bypass module 615 are possible.

Figure 7:
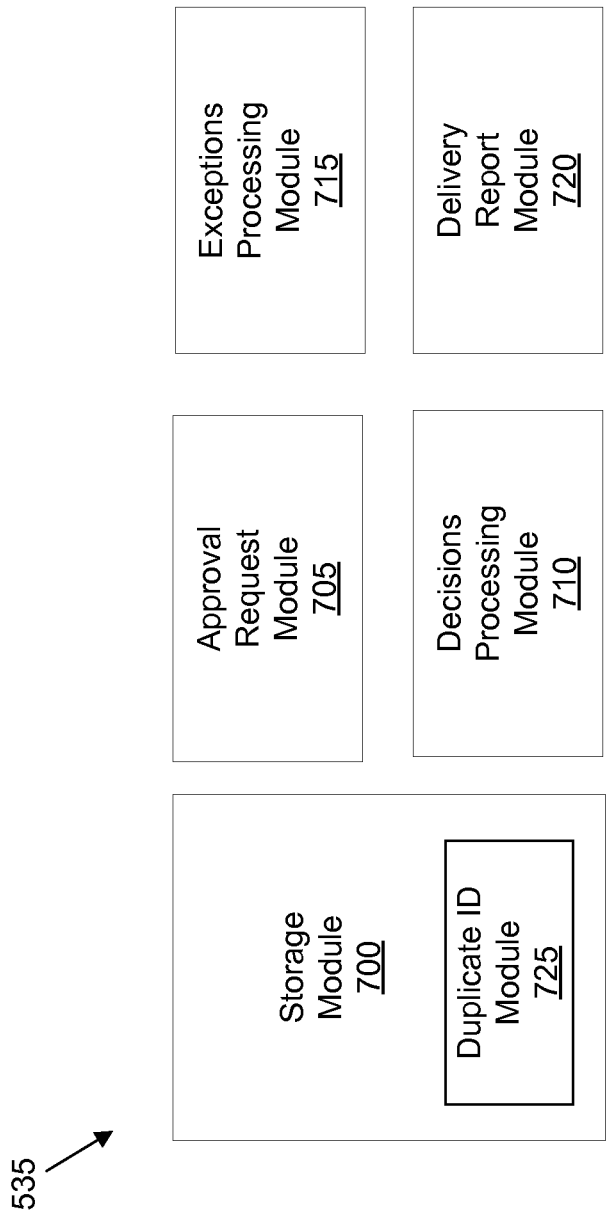
FIG. 7 shows example logical modules of the example arbitration module of the server device of FIG. 5.

Referring now to FIG. 7, the example arbitration module 535 of FIG. 5 is shown in further detail. In example embodiments, the arbitration module 535 includes user configurable logical modules of software executing on the server device 515 that enable the arbitration module 535 to control workflow related to processing of an electronic communication (e.g., the e-mail message 540) pending a moderation decision.

The example arbitration module 535 includes a storage module 700, an approval request module 705, a decisions processing module 710, an exceptions processing module 715, and a delivery report module 720.

The example storage module 700 is configured to receive and hold an electronic communication as routed from the intercept module 530 upon a determination by the intercept module 530 that the electronic communication requires moderation. In the example embodiment of FIG. 5, the storage module 700 is configured to store the e-mail message 540 pending receipt of the decision message 550 by the arbitration module 535. The storage module 700 is further configured to hold the e-mail message 540 until a status of the e-mail message 540 reaches an expired status, as described in further detail below with respect to the exceptions processing module 715.

In example embodiments, the storage module 700 includes a duplicate identification module 725. The duplicate identification module 725 is configured to scan the storage module 700 to determine if a newly received electronic communication is a duplicate of an electronic communication already stored in the storage module 700. In the example embodiment of FIG. 5, the duplicate identification module 725 is configured to scan the storage module 700 to determine if a duplicate of the e-mail message 540 is already stored on the storage module 700. In some embodiments, duplicate communications are identified by one or more content of a respective electronic communication. For example, two or more e-mail messages may be considered duplicate when respective unique message identification, sender SMTP address, recipient SMTP address, and message sent-time are evaluated as equivalent by the duplicate identification module 725. If the duplicate identification module 725 detects that a duplicate electronic communication exists, the most recent communication received (e.g., e-mail message 540) is deleted. Other embodiments of the storage module 700 are possible.

The example approval request module 705 is configured to generate and send an approval request to designated moderators of an electronic communication to permit a moderator to designate the electronic communication as approved or denied for delivery to a designated recipient. In the example embodiment of FIG. 5, the approval request module 705 is configured to generate and send the approval request message 545 to the moderator devices 510 to permit the e-mail message 540 to be designated as approved or denied for delivery to the recipient device 520, as described in further detail below in connection with FIG. 8. In the example embodiment, the approval request message 545 is only sent to the moderator devices 510 if the duplicate identification module 725 does not detect that a duplicate of the e-mail message 540 exists within storage module 700, thereby indicating the existence of either a pending or expired approval request message 545 corresponding to the e-mail message 540. Other embodiments of the approval request module 705 are possible.

The example decisions processing module 710 is configured to process a moderation decision designating an electronic communication as approved or denied for delivery to designated recipient devices as set forth by a moderator device. In the example embodiment of FIG. 5, the decisions processing module 710 is configured to process the decision message 550 containing information designating the e-mail message 540 as approved or denied for delivery to the recipient device 520. In the example embodiment, the moderator devices 510 share workload related to moderating the e-mail message 540 and each receives the approval request message 545. In some embodiments, the first moderation decision received is processed by the arbitration module 535. For example, when the decisions processing module 710 receives the decision message 550 from moderator device 510a, the decisions processing module 710 sends the update action 555 to the moderator device 510b. As described above, the update action 555 locates the approval request message 545 in the inbox of the client interface 525 of the moderator device 510b, adds one or more properties to the approval request message 545 and, in some embodiments, moves the approval request message 545 to a deleted items folder of the client interface 525 of the moderator device 510b. Other embodiments of the decisions processing module 710 are possible.

The example exceptions processing module 715 is configured to process exceptions related to processing of an electronic communication designated as requiring moderation. For example, in some embodiments, a communication stored in the storage module 700 may be marked as expired after a configurable elapsed time period. In some embodiments, all approval requests related to the expired communication are subsequently removed from moderator workflow. In the example embodiment of FIG. 5, the exceptions processing module 715 is configured such that upon expiration of the e-mail message 540 stored in the storage module 700, the exceptions processing module 715 sends the update action 555 that, in the example scenario, is configured to locate the approval request message 545 in the inbox of the client interface 525 of each of the respective moderator devices 510a-b and move the approval request message 545 to the respective deleted items folder. In the example embodiment, the update action 555 adds one or more properties to the approval request message 545, such as properties indicating expiration of the e-mail message 540. Additionally, in some embodiments, the exceptions processing module 715 is configured to populate and send the notification message 560 to the recipient device 520 containing information designating that moderators are not available to approve the e-mail message 540. However, other embodiments are possible as well. For example, in some embodiments, the exceptions processing module 715 is configured to re-direct or forward the approval request message 545 to one or more other moderator devices in event that the communication stored in the storage module 700 is marked as expired.

Still other embodiments are possible as well. For example, in some embodiments, the exceptions processing module 715 is configured to receive a manual command to operate on the approval request message 545 as desired, such as removing the approval request message 545 from moderator workflow, and other actions.

In other embodiments, the approval request message 545 as sent by the approval request module 705 may result in a non-deliverable response (NDR) or an out-of-office response (OOF). In general, the example exceptions processing module 715 is configured to process NDR and OOF responses. In the example embodiment of FIG. 5, the exceptions processing module 715 is configured to analyze an "in-reply-to" and a "references field" of NDR and OOF responses to locate the e-mail message 540 awaiting approval in the storage module 700. The exceptions processing module 715 increments a property in the pending e-mail message 540 that keeps track of a number of received NDR and OOF responses related to the e-mail message 540. If a sum of NDR and OOF responses is the same as the number of moderators (i.e., one for each of the respective moderator devices 510a-b), the exceptions processing module 715 populates and send the notification message 560 to the recipient device 520 containing information designating that the e-mail message 540 will not be approved because of an NDR response or that delivery of the e-mail message 540 to the recipient device 520 may be delayed because respective moderators are out-of-office. Other embodiments of the exceptions processing module 715 are possible.

The example delivery report module 720 is configured to provide reports related to processing of an electronic communication designated as requiring moderation. In the example embodiment of FIG. 5, the example delivery report module 720 is configured to provide a delivery report to the sender device 505 upon request to indicate status of processing of the e-mail message 540. In example embodiments, the delivery report module 720 instantiates a message tracking log corresponding to the e-mail message 540 to build the delivery report. For example, when the e-mail message 540 is redirected to the arbitration module 535, the delivery report module 720 inputs an entry into the message tracking log indicating that moderation workflow has been started. In addition, the delivery report module 720 is configured to input an entry into the message tracking log indicating that the decision message 550 has been received and the update action 555 has been sent. The delivery report module 720 is configured to provide the message tracking log to the sender device 505 upon request. Other embodiments of the delivery report module 720 are possible.

Figure 8:
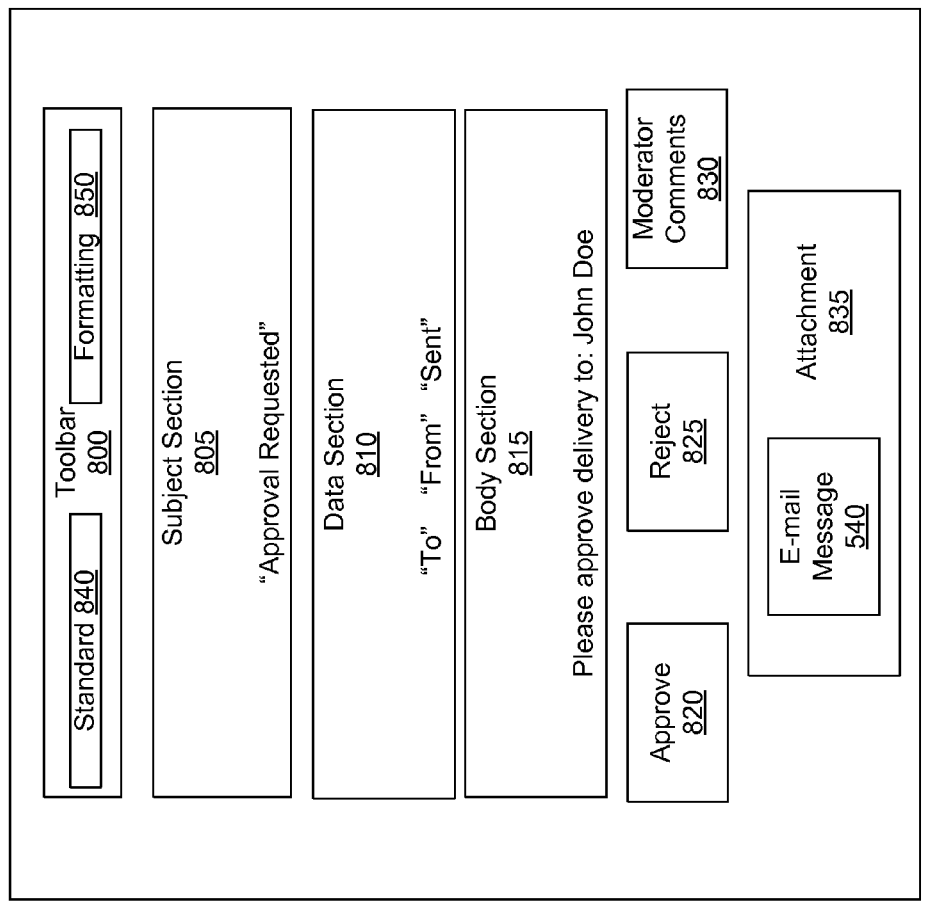
FIG. 8 shows an example approval request message.

Referring now to FIG. 8, an example embodiment of the approval request message 545 of FIG. 5 is shown. As described above, in some embodiments the approval request message 545 is an e-mail message configured to permit a moderator to designate the e-mail message 540 as approved or denied for delivery to the recipient device 520. In the example embodiment of FIG. 5, the approval request message 545 may include a plurality of features such as, for example, a toolbar 800, a subject section 805, a data section 810, a body section 815, an approve selection 820, a reject selection 825, a moderator comments selection 830, and an attachment section 835. Still other embodiments of the approval request message 545 are possible as well.

The example toolbar 800 may include one or more toolbars displaying a plurality of user selectable functions and commands related to e-mail messaging. For example, the toolbar 800 may include a "Standard" toolbar 840 including standard functions and commands, a "Formatting" toolbar 845 including formatting functions and commands, and other types of toolbars as well.

The example subject section 805 may include subject line information (e.g., "Approval Requested"). The example data section 810 may include sender information, recipient information, and time sent information (e.g., "To" and "From" and "Sent"). The example body section 815 may include text (e.g., "Please approve delivery to: John Doe").

In some embodiments, the example approve selection 820, reject selection 825, and moderator comments selection 830 are configured to permit a moderator to designate the e-mail message 540 as approved or denied for delivery to the recipient device 520 upon selection. For example, in some embodiments, selection of one of the approve selection 820 and the reject selection 825 may automatically send the decision message 550 to the arbitration module 535. Selection of the moderator comments selection 830 may instantiate a window that permits a moderator to enter text into the decision message 550 prior to sending the decision message 550 to the arbitration module 535. The example attachment section 835 may include an attachment of the e-mail message 540 pending delivery to the recipient device 520. In this manner, a moderator may view of the e-mail message 540 prior to making a moderation decision. Still other embodiments are possible as well.

Figure 9:
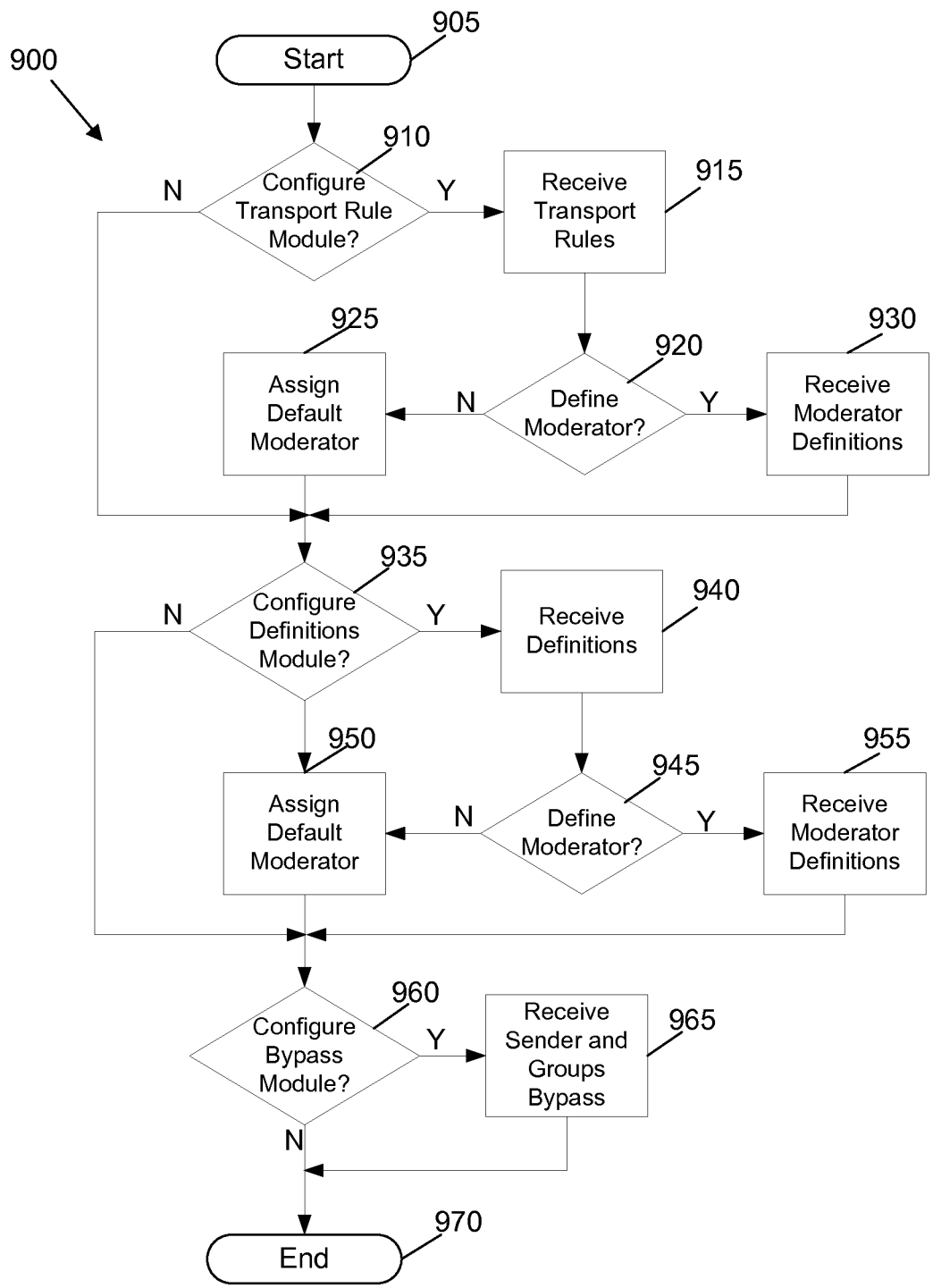
FIG. 9 shows a flowchart for an example method for configuration of example systems and method for moderating electronic communications.

Referring now to FIG. 9, an example method 900 for configuring a system for moderating electronic communications is shown. The example method 900 is instantiated at a start module 905. The start module 905 corresponds to a user, such as an administrator, accessing functionality of the intercept module 530 via the client device 205 or server device 515, as described above in connection with FIGS. 2-8.

In response to the user accessing the intercept module 530, the intercept module 530 presents the user with an option to configure the transport rule module 605 at an operation 910. As mentioned above, the transport rule module 605 contains user configurable definitions specifying one or more rules that are evaluated by the intercept module 530 to determine if an electronic communication (e.g., e-mail message 540) should be moderated, based on content of the electronic communication. For example, a user may configure the transport rule module 605 to determine whether there are any expletive remarks contained within the text of an electronic communication received by the intercept module 530. In this manner, moderation is integrated with a transport rule as an action that can be applied to the electronic communication.

In response to the intercept module 530 receiving a non-affirmative selection at operation 910, operational flow proceeds to an operation 935 in which the intercept module 530 presents the user with an option to configure the definitions module 610, described further below.

In response to the intercept module 530 receiving an affirmative selection at operation 910, operational flow proceeds to an operation 915 in which the transport rule module 605 receives one or more transport rule definitions. Next, at an operation 920, the intercept module 530 presents the user with an option to define one or more moderators associated with each of the one or more transport rules received at operation 915. For example, a user may be presented with an option to explicitly define a moderator to moderate all electronic communications having expletive remarks contained within the text of an electronic communication received by the intercept module 530. Other embodiments are possible as well.

In response to the intercept module 530 receiving a non-affirmative selection at operation 920, operational flow proceeds to an operation 925 in which the transport rule module 605 assigns one or more default moderators to each of the one or more transport rules as received at operation 915. For example, the transport rule module 605 may assign an office manager as a moderator to moderate all electronic communications containing expletive remarks contained within the text of electronic communications received by the transport rule module 605. Operational flow then proceeds to the operation 935.

In response to the intercept module 530 receiving an affirmative selection at operation 920, operational flow proceeds to an operation 930 in which the transport rule module 605 receives moderator definitions associating one or more moderators with each of the one or more transport rules received at operation 915. In general, the intercept module 530 is configured to receive new moderator definitions and receive modifications to existing moderator definitions, such, for example, receiving changes to an existing moderator e-mail address. Still other embodiments are possible as well. Operational flow then proceeds to the operation 935.

At operation 935, the intercept module 530 presents the user with an option to configure the definitions module 610. As described above, the definitions module 610 contains user configurable definitions specifying recipients such as an individual recipient and/or distribution groups that should be moderated.

In response to the intercept module 530 receiving a non-affirmative selection at operation 935, operational flow proceeds to an operation 960 in which the intercept module 530 presents the user with an option to configure the bypass module 615, described further below.

In response to the intercept module 530 receiving an affirmative selection at operation 935, operational flow proceeds to an operation 940 in which the definitions module 610 receives one or more definitions specifying recipients that should be moderated. Next, at an operation 945, the intercept module 530 presents the user with an option to define one or more moderators associated with each of the one or more definitions specifying recipients that should be moderated as received at operation 940. For example, a user may be presented with an option to explicitly define a moderator to moderate all electronic communications received by the intercept module 530 as sent to recipient John Doe having an SMTP address john.doe@company.com. Other embodiments are possible as well.

In response to the intercept module 530 receiving a non-affirmative selection at operation 945, operational flow proceeds to an operation 950 in which the definitions module 610 assigns one or more default moderators to each of the one or more definitions specifying recipients that should be moderated defined as received at operation 940. For example, the definitions module 610 may assign a manager of John Doe as a moderator to moderate all electronic communications received by the intercept module 530 as sent to the recipient John Doe. Operational flow then proceeds to the operation 960.

In response to the intercept module 530 receiving an affirmative selection at operation 945, operational flow proceeds to an operation 955 in which the definitions module 610 receives moderator definitions associating one or more default moderators to each of the one or more definitions specifying recipients that should be moderated as received at operation 940. Operational flow then proceeds to the operation 960.

At operation 960, the intercept module 530 presents the user with an option to configure the bypass module 615. As described above, the bypass module 615 contains user configurable definitions specifying one or more users who can send messages freely without requiring approval by moderators. The example bypass module 615 further contains user configurable definitions specifying child bypass via the child bypass selection 625.

In response to the intercept module 530 receiving a non-affirmative selection at operation 960, operational flow proceeds to an end module 970 corresponding to termination of the example method 900.

In response to the intercept module 530 receiving an affirmative selection at operation 960, operational flow proceeds to an operation 965 in which the bypass module 615 receives one or more of definitions specifying one or more users who can send messages freely without requiring approval by moderators and one or more definitions specifying one or distribution groups for child bypass. In the example embodiments, the one or more definitions specifying one or more distribution groups for child bypass are defined via a setting of the child bypass selection 625 to true. Operational flow then proceeds to an end module 970 corresponding to termination of the example method 900.

The example embodiments described herein can be implemented as logical operations in a computing device in a networked computing system environment. The logical operations can be implemented as: (i) a sequence of computer implemented instructions, steps, or program modules running on a computing device; and (ii) interconnected logic or hardware modules running within a computing device.

For example, the logical operations can be implemented as algorithms in software, firmware, analog/digital circuitry, and/or any combination thereof, without deviating from the scope of the present disclosure. The software, firmware, or similar sequence of computer instructions can be encoded and stored upon a computer readable storage medium and can also be encoded within a carrier-wave signal for transmission between computing devices.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computing device, comprising:
 a processing unit;
 a system memory connected to the processing unit, the system memory comprising instructions that, when executed by the processing unit, cause the processing unit to:
  create an arbitration module configured to control a moderation workflow relating to an electronic message sent to at least one recipient, wherein the arbitration module delivers an approval request message to a first moderator and a second moderator requesting a moderation decision designating delivery of the electronic message to the at least one recipient as approved or declined, and upon receipt of the moderation decision by the first moderator, the arbitration module updates the approval request message sent to the second moderator and removes the approval request message from the moderation workflow of the second moderator by moving the approval request message from an inbox to a deleted items folder of the second moderator; and create an intercept module configured to intercept the electronic message when the electronic message is sent to the at least one recipient, wherein the intercept module evaluates content of the electronic message to determine whether the electronic message requires moderation prior to delivering the electronic message to at least one recipient, and if the electronic message requires moderation transferring the electronic message to the arbitration module upon determining the electronic message requires moderation.

2. The computing device of claim 1, wherein the content of the electronic message is selected from at least one of a group comprising: text; graphics; attachments; a unique message identification; a sender SMTP address; a recipient SMTP address; and a message sent-time.

3. The computing device of claim 1, wherein the intercept module is configured to evaluate the content of the electronic message against one or more user configurable message transport rules to determine whether the electronic message requires moderation.

4. The computing device of claim 1, wherein the at least one recipient comprises one or more of an individual recipient and a distribution group comprising a plurality of individual recipients, and wherein the intercept module is further configured to evaluate the content of the electronic message against a user configurable definition specifying the at least one recipient as a moderated recipient to determine whether the electronic message requires moderation.

5. The computing device of claim 1, wherein the intercept module is further configured to evaluate the content of the electronic message against a user configurable definition specifying a sender of the electronic message as a sender approved to freely send electronic messages without requiring an approval by a moderator to determine whether the electronic message requires moderation.

6. The computing device of claim 1, wherein the arbitration module is further configured to evaluate the electronic message upon transfer of the electronic message from the intercept module to determine if the electronic message is a duplicate of a previously received message.

7. The computing device of claim 6, wherein the arbitration module is further configured to prevent delivery of the approval request message upon determination the electronic message is a duplicate.

8. The computing device of claim 1, wherein the arbitration module is configured to evaluate the electronic message as expired after a configurable time period elapses after receiving the electronic message from the intercept module and update the approval request message by at least one of adding one or more properties to the approval request message indicating expiration of the approval request message and moving the approval request message from an inbox to a deleted items folder of the first moderator and the second moderator.

9. The computing device of claim 1, wherein the arbitration module is further configured to process a non-deliverable response and an out-of-office response in response to delivering the approval request message to the first moderator and the first moderator being unavailable to provide the moderation decision, and send a notification to a sender of the electronic message indicating that the electronic message may be at least one of not approved and delayed.

10. The computing device of claim 1, wherein the arbitration module is further configured to provide a status report to a sender of the electronic message upon request indicating a current status of the electronic message in the moderation workflow.

11. The computing device of claim 1, wherein the arbitration module is configured to:
determine if a pre-defined time period has elapsed since the approval request message was sent to the first moderator indicating the approval request message has expired; and
if the pre-defined period has elapsed, send a notification to the sender indicating that the electronic message will not be approved.

12. The computing device of claim 1, wherein the arbitration module is configured to:
release the electronic message to the at least one recipient upon the first moderation decision message.

13. The computing device of claim 1, wherein the arbitration module is configured to:
release the electronic message to the at least one recipient upon the first moderation decision message including an indication that delivery of the electronic message to the at least one recipient is approved.

14. A method for moderating an electronic message, the method comprising:
intercepting the electronic message at a server computing device;
evaluating content of the electronic message at the server computing device to determine if the electronic message is required to enter a moderation workflow prior to delivering the electronic message to at least one recipient;
storing the electronic message at the server computing device upon determining the electronic message is required to enter the moderation workflow;
sending an approval request message from the server computing device to a first moderator and a second moderator, the approval request message requesting a moderation decision designating delivery of the electronic message to the at least one recipient as approved or declined;
receiving a first moderation decision message at the server computing device from the first moderator;
sending an update message from the server computing device to the second moderator to update the approval request message to include one or more properties of the first moderation decision;
removing the approval request message from the moderation workflow for the second moderator by moving the approval request message from the inbox to a deleted items folder of the second moderator; and
sending a notification message to a sender of the electronic message indicating that delivery of the electronic message is approved when the moderation decision approves the electronic message, and sending a notification message to the sender of the electronic message indicating that delivery of the electronic message is declined when the moderation decision declines the electronic message.

15. The method of claim 14, further comprising:
evaluating the content of the electronic message at the server computing device to determine if a duplicate of the electronic message is stored at the server computing device; and
preventing the electronic message from entering the moderation workflow upon determining that a duplicate of the electronic message is stored at the server computing device.

16. The method of claim 14, further comprising evaluating the content of the electronic message at the server computing device against one or more user configurable transport rules to determine if the electronic message is required to enter the moderation workflow.

17. The method of claim 14, further comprising:
receiving one or more of a non-deliverable response and an out-of-office response at the server computing device from the first moderator; and
sending a notification from the server computing device to the sender indicating that the electronic message may not be approved or may be delayed.

18. The method of claim 14, further comprising:
determining if a pre-defined time period has elapsed since the approval request message was sent to the first moderator indicating the approval request message has expired; and
if the pre-defined period has elapsed, sending a notification to the sender indicating that the electronic message will not be approved.

19. The method of claim 14, further comprising:
sending the approval request message from the server computing device to an inbox of the second moderator; and
releasing the electronic message to the at least one recipient upon the first moderation decision message including an indication that delivery of the electronic message to the at least one recipient is approved.

20. A computer readable storage device having computer-executable instructions that, when executed by a computing device, cause the computing device to perform steps comprising:
intercepting the electronic message at a computing device;
evaluating content of the electronic message at the computing device to determine if the electronic message is required to enter a moderation workflow prior to delivering the electronic message to at least one recipient;
storing the electronic message at the computing device upon determining the electronic message is required to enter the moderation workflow;
sending an approval request message from the computing device to an inbox of a first moderator and a second moderator, the approval request message requesting a moderation decision designating delivery of the electronic message to the at least one recipient as approved or declined;
receiving a first moderation decision message at the computing device from the first moderator;
if a first moderation decision message is received from the first moderator, sending an update message from the computing device to the second moderator to update the approval request message to include one or more properties of the first moderation decision, removing the approval request message from the moderation workflow by moving the approval request message from the inbox to a deleted items folder of the second moderator, and sending a notification message to a sender of the electronic message indicating that delivery of the electronic message is approved when the moderation decision approves the electronic message, and sending a notification message to the sender of the electronic message indicating that delivery of the electronic message is declined when the moderation decision declines the electronic message;
if a pre-defined time period has elapsed since the approval request message was sent to the first moderator and the second moderator, sending a notification to the sender indicating that the electronic message will not be approved; and
removing the approval request message from the moderation workflow by moving the approval request message from the inbox to a deleted items folder of the first moderator and the second moderator.

21. The computer readable storage device of claim 20, further comprising when a first moderation decision message is received from the second moderator, sending an update message from to the first moderator to update the approval request message to include one or more properties of a second moderation decision.

* * * * *